United States Patent
Koseki et al.

(10) Patent No.: US 9,979,865 B2
(45) Date of Patent: May 22, 2018

(54) VEHICLE-MOUNTED ELECTRONIC APPARATUS

(71) Applicant: FUJITSU TEN LIMITED, Kobe-shi, Hyogo (JP)

(72) Inventors: Tomohisa Koseki, Kobe (JP); Masashi Otomi, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 245 days.

(21) Appl. No.: 14/995,659

(22) Filed: Jan. 14, 2016

(65) Prior Publication Data
US 2016/0236558 A1  Aug. 18, 2016

(30) Foreign Application Priority Data
Feb. 17, 2015  (JP) ................ 2015-028843

(51) Int. Cl.
| | |
|---|---|
| *H04N 5/232* | (2006.01) |
| *H04N 5/225* | (2006.01) |
| *E05B 83/18* | (2014.01) |
| *B60R 11/04* | (2006.01) |
| *E05B 81/76* | (2014.01) |
| *B60R 11/00* | (2006.01) |

(52) U.S. Cl.
CPC ........... *H04N 5/2252* (2013.01); *B60R 11/04* (2013.01); *E05B 81/76* (2013.01); *E05B 83/18* (2013.01); *H04N 5/2251* (2013.01); *B60R 2011/004* (2013.01); *B60R 2011/0094* (2013.01)

(58) Field of Classification Search
CPC ....... E05B 83/18; E05B 81/76; H04N 5/2252; H04N 5/2251; B60R 11/04
See application file for complete search history.

(56) References Cited

U.S. PATENT DOCUMENTS

| | | | | |
|---|---|---|---|---|
| 9,718,414 | B2* | 8/2017 | Da Deppo | B60R 11/04 |
| 2006/0171704 | A1* | 8/2006 | Bingle | B60R 11/04 |
| | | | | 396/419 |
| 2009/0309971 | A1* | 12/2009 | Schuetz | B60R 11/04 |
| | | | | 348/148 |
| 2013/0155238 | A1* | 6/2013 | Scudder | B60R 11/04 |
| | | | | 348/148 |
| 2013/0182112 | A1* | 7/2013 | Liepold | B60R 11/04 |
| | | | | 348/148 |

FOREIGN PATENT DOCUMENTS

| | | |
|---|---|---|
| JP | H02-144239 A | 6/1990 |
| JP | 2006-193121 A | 7/2006 |
| JP | 2010-501417 A | 1/2010 |
| JP | 2010-155484 A | 7/2010 |
| JP | 2012-107489 A | 6/2012 |
| JP | 2012-171535 A | 9/2012 |

* cited by examiner

*Primary Examiner* — Neil Mikeska
(74) *Attorney, Agent, or Firm* — Oliff PLC

(57) ABSTRACT

A vehicle-mounted electronic apparatus includes: a camera that captures images of an outside of the vehicle; a storage chamber in which the camera is stored; a lid that opens and closes an aperture extending between an inside of the storage chamber and an outside of the storage chamber. Moreover, the vehicle-mounted electronic apparatus further includes an opening switch that is actuated in response to pressure applied to the lid and that sends a signal for opening a door of a luggage compartment of the vehicle when the opening switch is actuated. Thus, the opening switch and the camera can be disposed in a same position of the vehicle.

8 Claims, 11 Drawing Sheets

VEHICLE-MOUNTED ELECTRONIC APPARATUS

BACKGROUND OF THE INVENTION

Field of the Invention

The invention relates to a vehicle-mounted electronic apparatus that is mounted on a vehicle.

Description of the Background Art

Generally, an opening switch is provided to a rear portion of a vehicle, such as a car, to open a door of a rear luggage compartment, such as a trunk lid and a tailgate. Moreover, recently, a camera is installed to the rear portion of the vehicle to capture images of an area behind the vehicle such that a driver of the vehicle can see the area behind the vehicle.

The opening switch and the camera are installed to, for example, a portion above a license plate of the rear portion of the vehicle (for example, refer to Japanese patent application laid-open publication No. 2006-193121).

In addition to the opening switch and the camera, other parts, including a license-plate lamp for lighting the license plate, need to be installed to the portion above the license plate (for example, refer to Japanese patent application laid-open publication No. 2006-193121). Therefore, if the opening switch and the camera are separately installed, a space for the other parts to be installed is small.

Moreover, it is recommended that the opening switch should be installed near a center in the horizontal direction of the rear portion of the vehicle for a user to operate the switch instinctively. However, it is also recommended that the camera should be installed near the center in the horizontal direction of the rear portion of the vehicle such that an optical axis of the camera is along a center line extending from the center of the vehicle in the horizontal direction. Therefore, a technology for installing an opening switch and a camera in a same portion is demanded.

SUMMARY OF THE INVENTION

According to one aspect of the invention, a vehicle-mounted electronic apparatus that is configured to be mounted on a vehicle includes: a camera that captures images of an outside of the vehicle; a storage chamber in which the camera is stored; a lid that opens and closes an aperture extending between an inside of the storage chamber and an outside of the storage chamber; and an opening switch that is actuated in response to pressure applied to the lid and that sends a signal for opening a door of a luggage compartment of the vehicle when the opening switch is actuated.

A user can actuate the opening switch to open the door of the luggage compartment of the vehicle by pressing the lid that opens and closes the aperture. Therefore, the opening switch and the camera can be disposed in a same position.

According to another aspect of the invention, the vehicle-mounted electronic apparatus further includes a switch knob that causes the opening switch to be actuated by moving in a predetermined direction toward the opening switch. When the pressure is applied to the lid, the lid presses the switch knob to move the switch knob in the predetermined direction.

The user can actuate the opening switch by pressing any of the switch knob and the lid. The user does not have to discriminate the switch knob from the lid to operate the opening switch.

According to another aspect of the invention, the camera captures images of an area behind the vehicle, and the luggage compartment is a rear luggage compartment of the vehicle, and the opening switch sends the signal for opening the door of the rear luggage compartment of the vehicle.

Both of the camera and the opening switch can be disposed to a center position of a rear portion of the vehicle.

Therefore, an object of the invention is to dispose an opening switch and a camera in a same position.

These and other objects, features, aspects and advantages of the invention will become more apparent from the following detailed description of the invention when taken in conjunction with the accompanying drawings.

DESCRIPTION OF THE EMBODIMENTS

An embodiment of the invention will be described below with reference to the drawings.

<1. Outline of Vehicle-Mounted Electronic Apparatus>

Figure 1:
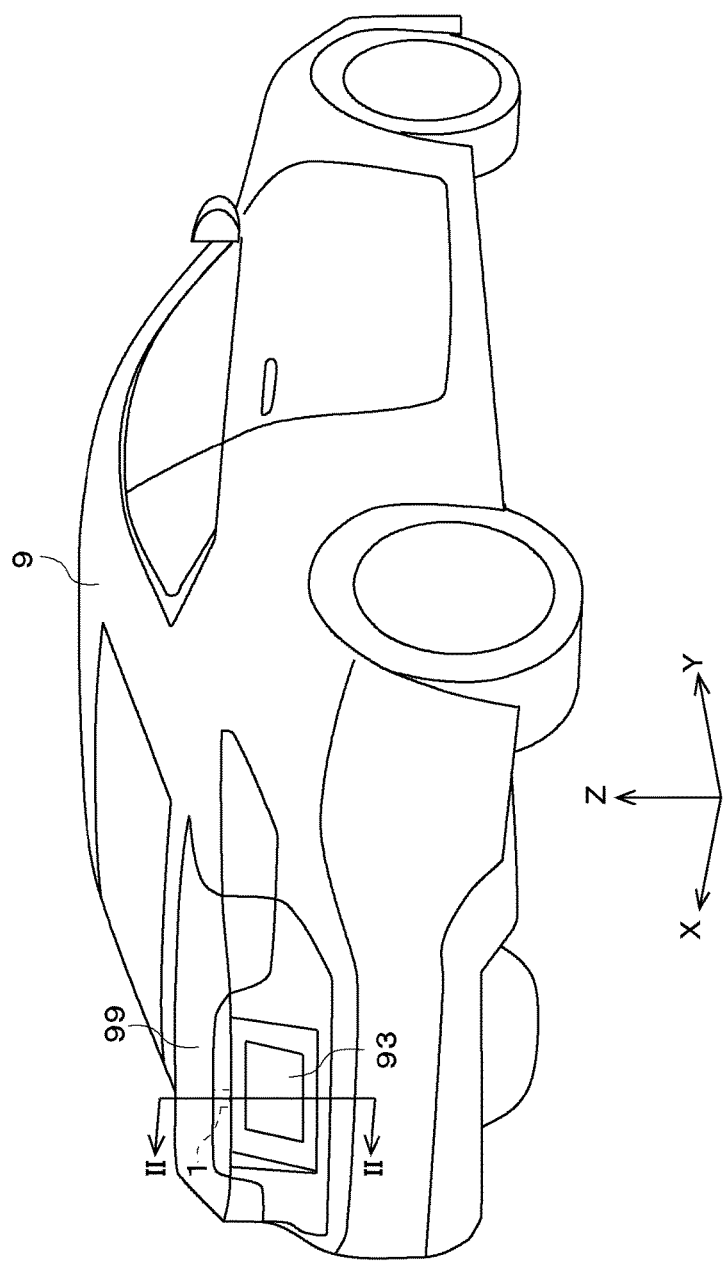
FIG. 1 illustrates a vehicle on which a vehicle-mounted electronic apparatus is mounted.

FIG. 1 illustrates a vehicle 9, such as a car, on which a vehicle-mounted electronic apparatus 1 that is an embodiment of the invention is mounted, viewed from behind the vehicle 9. As shown in FIG. 1, the vehicle-mounted electronic apparatus 1 is provided to a center of the vehicle 9 in a horizontal direction above a license plate 93 on a rear portion of the vehicle 9.

A trunk that is a rear luggage compartment is provided to the rear portion of the vehicle 9. The vehicle-mounted electronic apparatus 1 includes a luggage compartment opening function for opening a trunk lid 99 that is a door of the trunk and image capturing function of capturing images of an area behind the vehicle 9.

Figure 2:
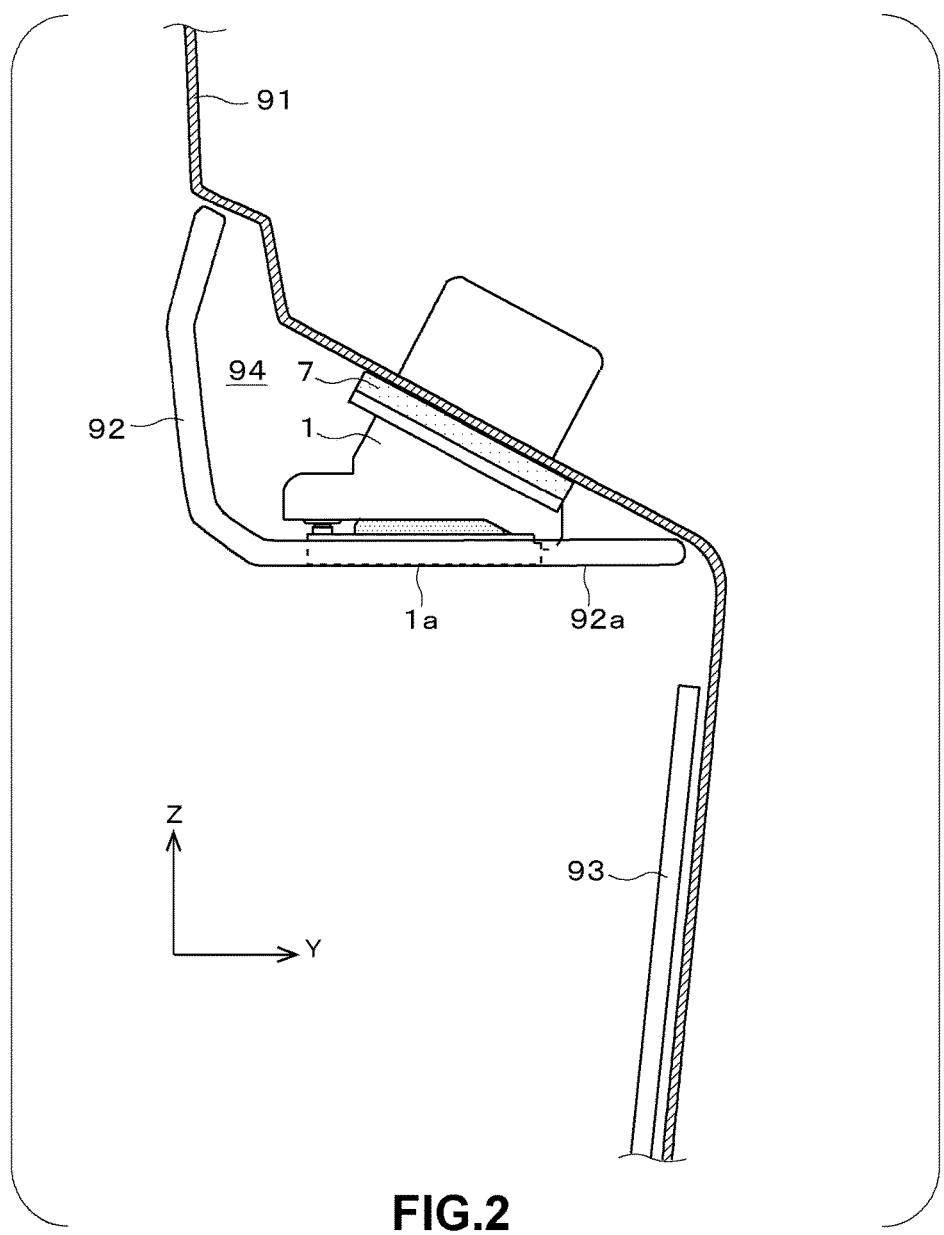
FIG. 2 illustrates a cross-section view of a rear portion of the vehicle.

FIG. 2 illustrates a cross-section view of the rear portion of the vehicle 9 along a line II to II in FIG. 1. The license plate 93 is provided to a metal vehicle back panel 91 of the rear portion of the vehicle 9. A resin garnish 92 is provided to the vehicle back panel 91 above the license plate 93. A bottom surface 92a of the garnish 92 extends substantially in the horizontal direction and a space 94 to which a part can be disposed is formed between the garnish 92 and the vehicle back panel 91.

The vehicle-mounted electronic apparatus 1 is fixed to the vehicle back panel 91 and a majority portion of the vehicle-mounted electronic apparatus 1 is disposed to the space 94 between the vehicle back panel 91 and the garnish 92. The vehicle-mounted electronic apparatus 1 is disposed such that a bottom surface 1a thereof is substantially along the horizontal direction. A lower portion of the vehicle-mounted electronic apparatus 1 is inserted in an opening formed on the bottom surface 92a of the garnish 92 such that the bottom surface 1a of the vehicle-mounted electronic apparatus 1 is substantially leveled with the bottom surface 92a of the garnish 92. In addition to the vehicle-mounted electronic apparatus 1, a license-plate lamp and other parts are also disposed in the space 94 between the vehicle back panel 91 and the garnish 92.

Figure 3:
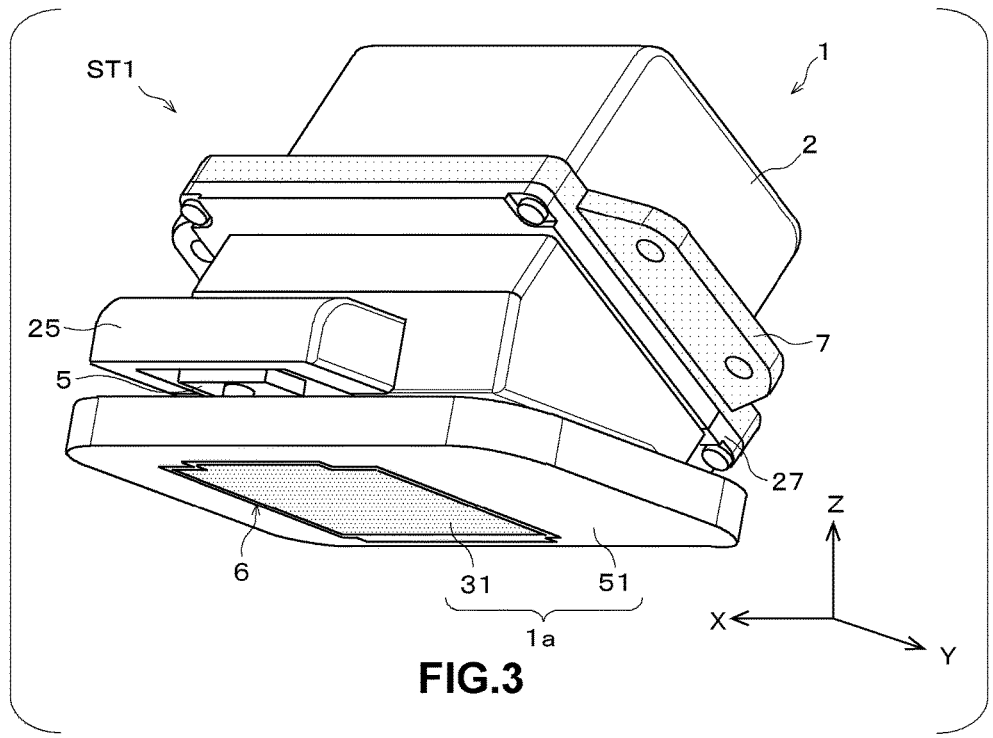
FIG. 3 illustrates a perspective view of an external appearance of the vehicle-mounted electronic apparatus.
Figure 4:
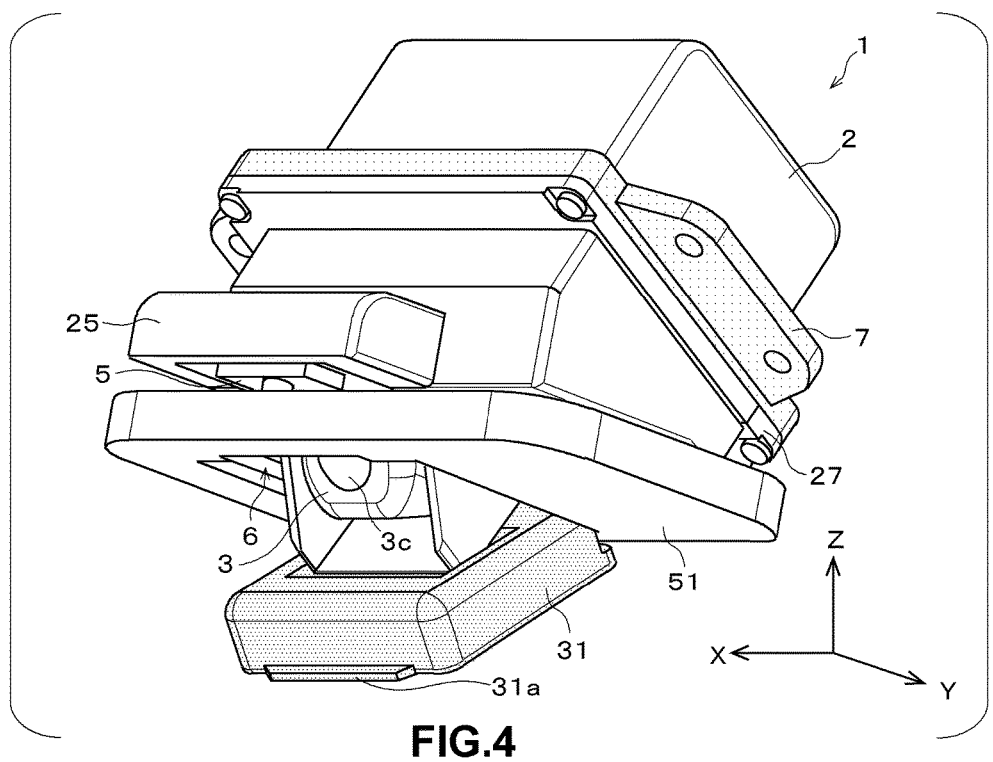
FIG. 4 illustrates a perspective view of an external appearance of the vehicle-mounted electronic apparatus.
Figure 5:
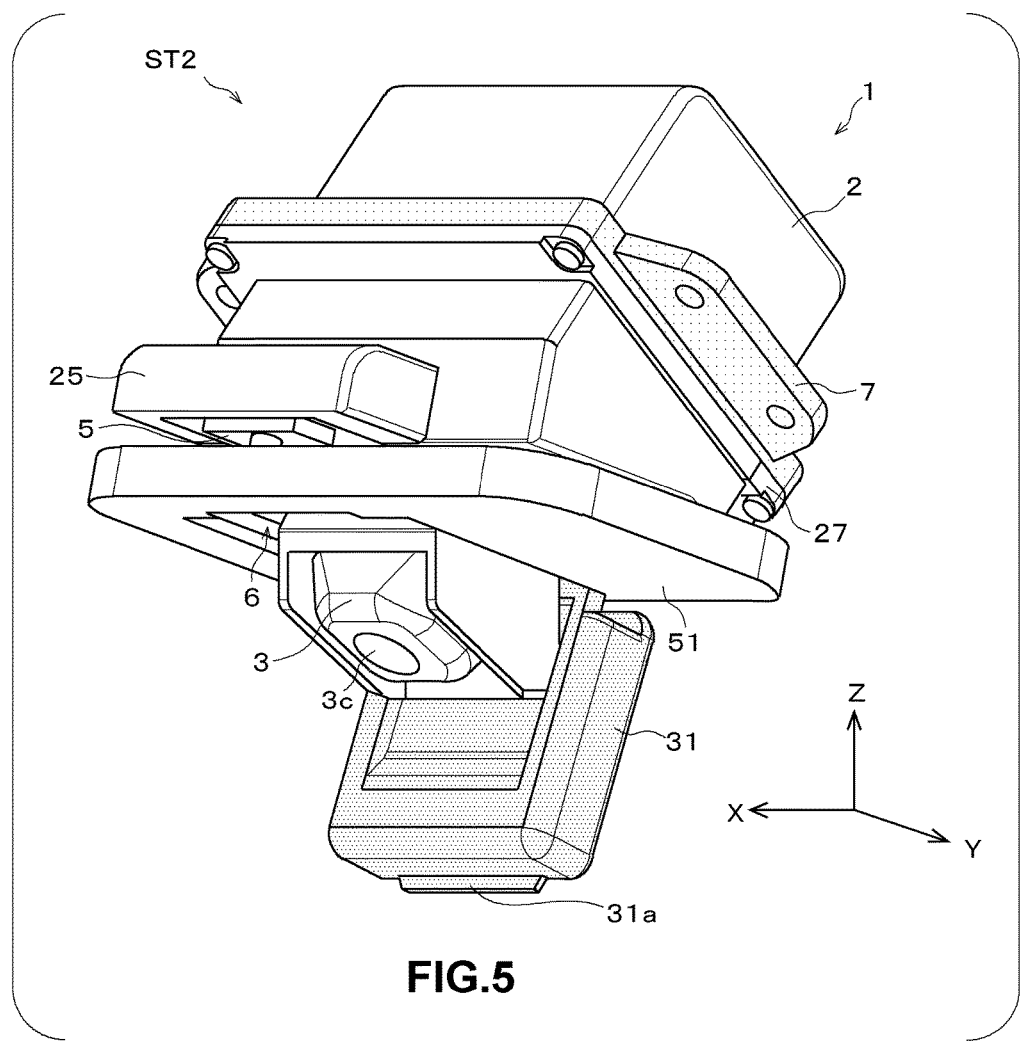
FIG. 5 illustrates a perspective view of an external appearance of the vehicle-mounted electronic apparatus.

FIGS. 3 to 5 illustrate perspective views of an external appearance of the vehicle-mounted electronic apparatus 1. In the description below, directions and orientations are shown by 3D Cartesian coordinates (X, Y and Z), as needed. The Cartesian coordinates are fixed relative to a housing 2 included in the vehicle-mounted electronic apparatus 1. An X-axis direction, and a Y-axis direction and a Z-axis direction correspond to the horizontal direction, a front-back direction and a vertical direction of the vehicle 9, respectively. In the description below, +X side and −X side are referred to as "left side" and "right side" of the vehicle 9, respectively, and +Y side and −Y side are referred to as "front side" and "rear side" of the vehicle 9, respectively (also refer to FIG. 1). Moreover, +Z side and −Z side are referred to as "upper side (upward)" and "lower side (downward)" of the vehicle 9 respectively.

As shown in those drawings, the vehicle-mounted electronic apparatus 1 includes the housing 2 inclined in the vertical direction (Z-axis direction). A bracket 7 is fixed to the housing 2, surrounding the housing 2. The vehicle-mounted electronic apparatus 1 is fixed to the vehicle 9 by fixing the bracket 7 to the vehicle back panel 91 of the vehicle 9 (also refer to FIG. 2).

Further, a switch cover 25 projects from a rear side (−Y side) of a lower portion of the housing 2. An opening switch 5 is provided inside the switch cover 25 to open the trunk lid 99 of the vehicle 9. The opening switch 5 is actuated (is turned on) by pressing, from a lower side (−Z direction), the opening switch 5 that is a push-button switch.

Moreover, a switch knob 51 which a user uses to operate the opening switch 5 is provided to a lower side of the housing 2. The switch knob 51 includes an aperture 6 extending between an inside of the housing 2 and an outside of the vehicle-mounted electronic apparatus 1. A lid 31 is provided to the lower side of the housing 2 to open and close the aperture 6.

While the image capturing function of the vehicle-mounted electronic apparatus 1 is off, the lid 31 closes the aperture 6, as shown in FIG. 3. A state in which the image capturing function of the vehicle-mounted electronic apparatus 1 is off as shown in FIG. 3 is hereinafter referred to as "no image capturing state" ST1.

Once the image capturing function of the vehicle-mounted electronic apparatus 1 is activated in the no image capturing state ST1 shown in FIG. 3, a camera 3 stored inside the housing 2 is moved outside through the aperture 6 as shown in FIG. 4. In this case, the lid 31 opens the aperture 6. As shown in FIG. 5, the camera is moved and eventually is in an image capturing position in which the camera 3 captures images of an outside of the vehicle 9. Thus, a lens 3c of the camera 3 is completely moved outside and can capture the images of the outside (area behind the vehicle 9) of the vehicle 9. A state in which the image capturing function of the vehicle-mounted electronic apparatus 1 is being activated as shown in FIG. 5 is hereinafter referred to as "image capturing state" ST2.

Once the image capturing function of the vehicle-mounted electronic apparatus 1 is deactivated in the image capturing state ST2 shown in FIG. 5, the camera 3 in the image capturing position is moved inside the housing 2 through the aperture 6 as shown in FIG. 4. Then, eventually, as shown in FIG. 3, the camera 3 is moved to a stored position inside the housing 2 and the lid 31 closes the aperture 6. Thus, the camera 3 is stored inside the housing 2, and the vehicle-mounted electronic apparatus 1 returns to the no image capturing state ST1.

<2. Electrical Configuration of Vehicle-Mounted Electronic Apparatus>

Figure 6:
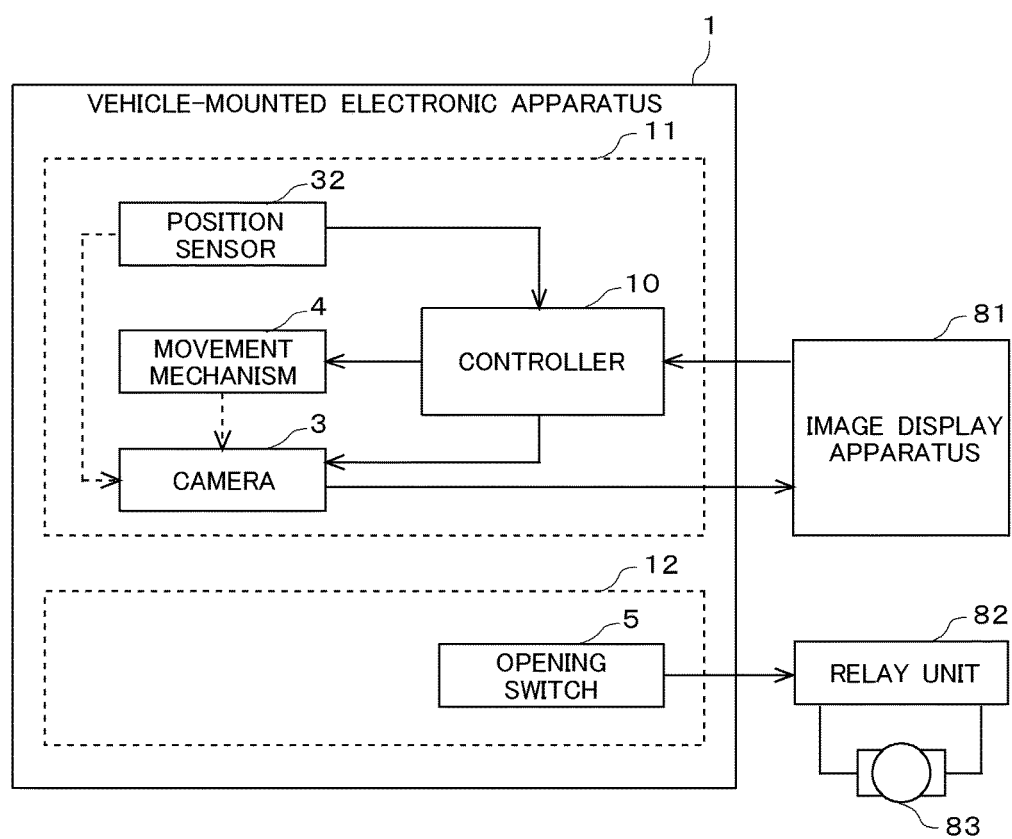
FIG. 6 illustrates an electrical configuration of the vehicle-mounted electronic apparatus.

Next, an electrical configuration of the vehicle-mounted electronic apparatus 1 is described. FIG. 6 illustrates the electrical configuration of the vehicle-mounted electronic apparatus 1. The vehicle-mounted electronic apparatus 1 includes two electrical systems, one of which is a first electrical system 11 for the image capturing function and a second electrical system 12 for the luggage compartment opening function, as the electrical configuration of the vehicle-mounted electronic apparatus 1. The first electrical system 11 and the second electrical system 12 function separately from each other.

The first electrical system 11 includes a movement mechanism 4, a position sensor 32 and a controller 10, in addition to the camera 3 described above. The movement mechanism 4 moves the camera 3, through the aperture 6, between the stored position in the housing 2 and the image capturing position in which the camera 3 captures the images of the outside the vehicle 9. The position sensor 32 detects a position of the camera 3 that is moved by the movement mechanism 4 and outputs to the controller 10 a signal representing the position of the camera 3.

The controller 10 is, for example, an integrated circuit and activates and deactivates the image capturing function. In a case where the controller 10 activates the image capturing function, the controller 10 controls the movement mechanism 4 to move the camera 3 to the image capturing position and then causes the camera 3 to start capturing images. Moreover, in a case where the controller 10 deactivates the image capturing function, the controller 10 causes the camera 3 to stop capturing the images and controls the movement mechanism 4 to move the camera 3 to the stored position. The controller 10 causes the camera 3 to move to the image capturing position or to the stored position, based on the signal representing the position of the camera 3, output by the position sensor 32.

Based on a signal from an image display apparatus 81 installed on the vehicle 9, the controller 10 activates or deactivates the image capturing function. For example, while monitoring a shift position of the vehicle 9, when the shift position is changed to reverse, the image display apparatus 81 sends, to the vehicle-mounted electronic apparatus 1, the signal requesting the vehicle-mounted electronic apparatus 1 to send images. In response to the signal, the controller 10 activates the image capturing function and causes the camera 3 to start capturing the images. The camera 3 sends the captured images to the image display apparatus 81. Thus, the images of the area behind the vehicle 9 are displayed on the image display apparatus 81.

For example, in a case where the shift position is changed to a position other than reverse, the image display apparatus 81 sends a signal to stop sending the images, to the vehicle-mounted electronic apparatus 1. In response to the signal, the controller 10 deactivates the image capturing function.

The second electrical system 12 includes the opening switch 5 described above. When the opening switch 5 is actuated, the second electrical system 12 sends, to a relay unit 82 installed on the vehicle 9, an opening signal for opening the trunk lid 99. When receiving the opening signal, the relay unit 82 unlocks the trunk lid 99 by driving an actuator 83. Thus, the trunk lid 99 is opened.

<3. Physical Configuration of the Vehicle-Mounted Electronic Apparatus>

Figure 7:
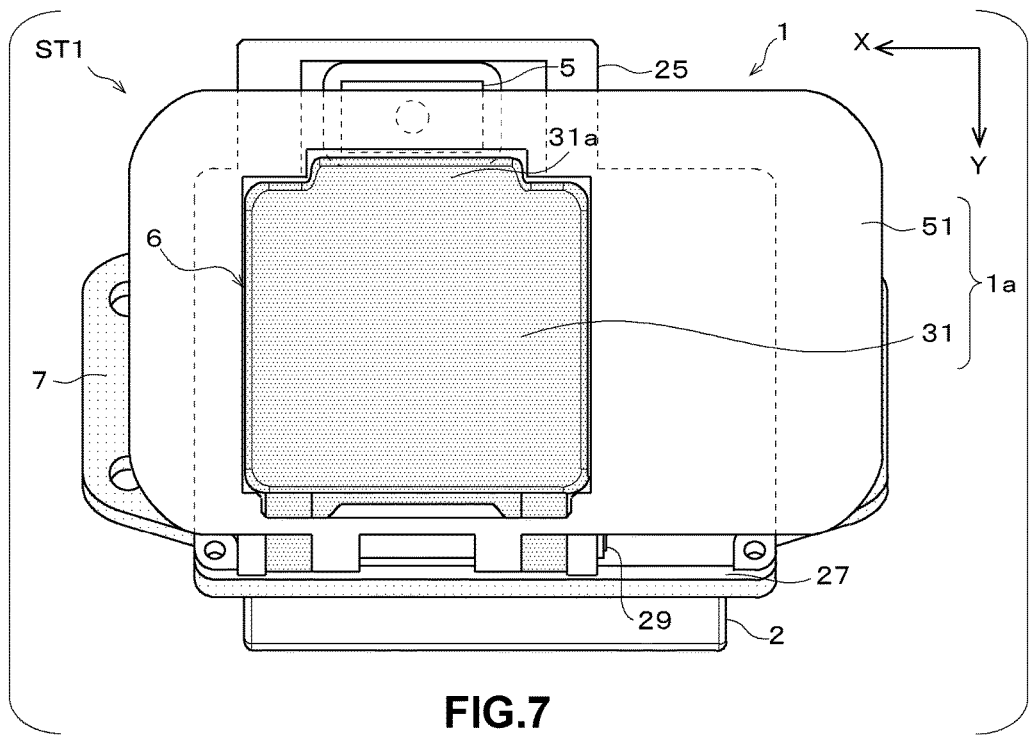
FIG. 7 illustrates a bottom view of the vehicle-mounted electronic apparatus.
Figure 8:
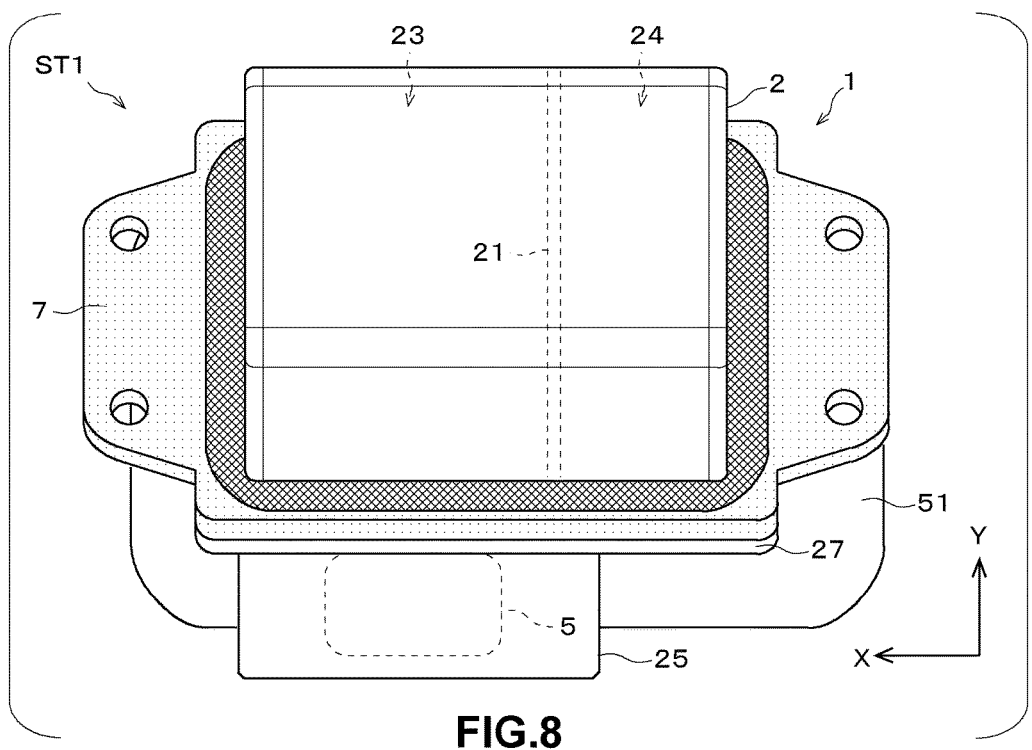
FIG. 8 illustrates a top view of the vehicle-mounted electronic apparatus.
Figure 9:
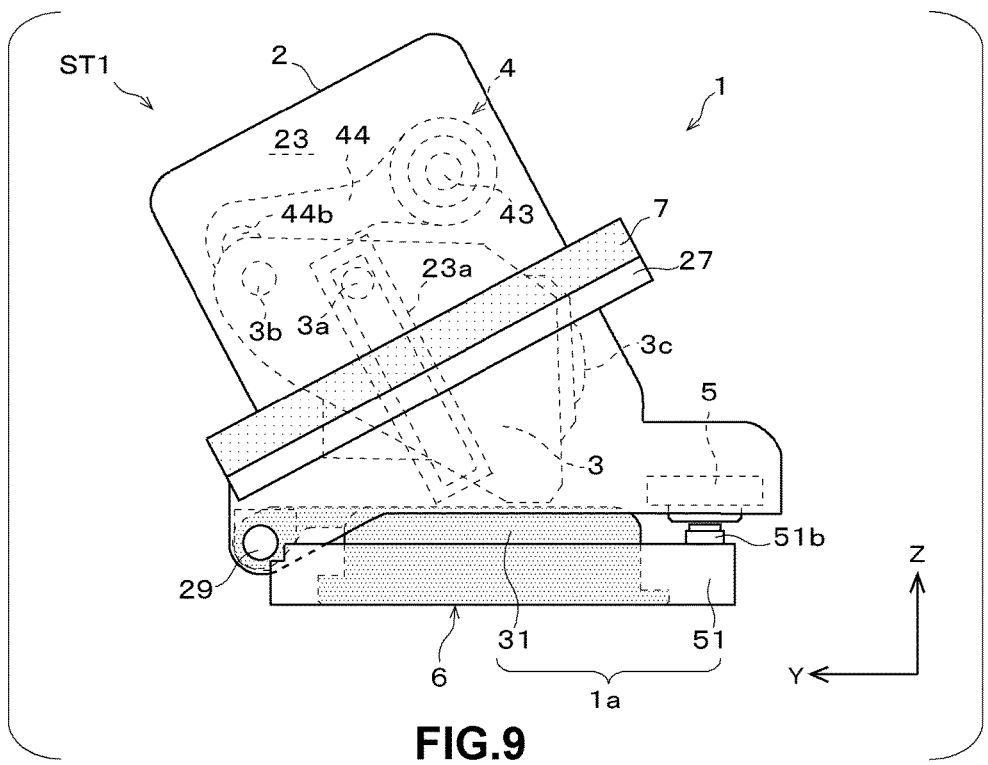
FIG. 9 illustrates a side view of the vehicle-mounted electronic apparatus viewed from a left side.
Figure 10:
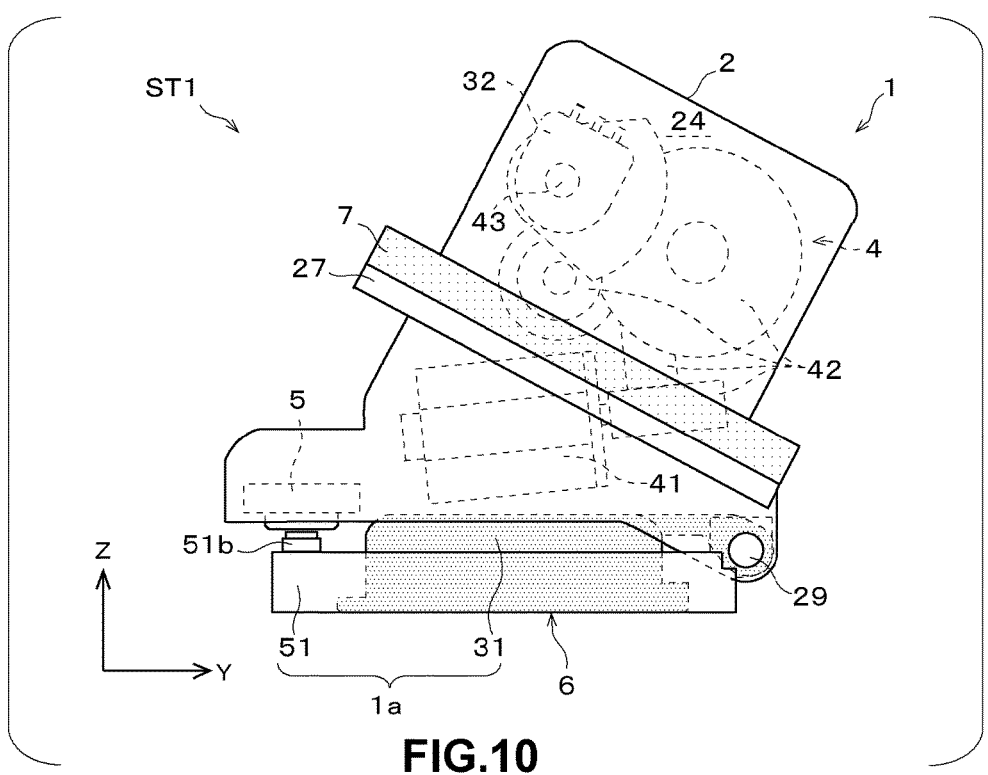
FIG. 10 illustrates a side view of the vehicle-mounted electronic apparatus viewed from a right side.

Next, a physical configuration of the vehicle-mounted electronic apparatus 1 is described in more detail. FIGS. 7 to 10 illustrate the physical configuration of the vehicle-mounted electronic apparatus 1. FIG. 7 illustrates a bottom view of the vehicle-mounted electronic apparatus 1 viewed from a lower side (−Z side) thereof. FIG. 8 illustrates a top view of the vehicle-mounted electronic apparatus 1 viewed from an upper side (+Z side) thereof. FIG. 9 illustrates a side view of the vehicle-mounted electronic apparatus 1 viewed from a left side (+X side) thereof, and FIG. 10 illustrates a side view of the vehicle-mounted electronic apparatus 1 viewed from a right side (−X side) thereof. These drawings illustrate the vehicle-mounted electronic apparatus 1 in the no image capturing state ST1.

As shown in FIG. 7, the switch knob 51 is disposed such that a rear end portion (end portion on a rear side (−Y side)) thereof overlaps with the opening switch 5 in the vertical direction (Z-axis direction). Moreover, when the vehicle-mounted electronic apparatus 1 is in the no image capturing state ST1, a main surface of the lid 31 is surrounded by a main surface of the switch knob 51. The main surface of the lid 31 is disposed to be substantially leveled with the main surface of the switch knob 51, and these main surfaces serve as the bottom surface 1a of the vehicle-mounted electronic apparatus 1 (also refer to FIG. 2).

Moreover, as shown in FIGS. 9 and 10, both of the lid 31 and the switch knob 51 are rotatably connected to the housing 2 with a support shaft 29 provided to a front side (+Y side) of the housing 2. A range in which the lid 31 rotates is a relatively large range to open the aperture 6. On the other hand, a range in which the switch knob 51 rotates is a relatively small range enough to actuate the opening switch 5.

A projection 51b facing the opening switch 5 is provided to the rear end portion of the switch knob 51. Moreover, an elastic member (not illustrated in the drawings), such as rubber, is provided between the switch knob 51 and the housing 2. Downward (−Z side) force is added to the switch knob 51 against the housing 2 by the elastic member.

When the user presses the main surface of the switch knob 51 from the lower side (−Z side), the switch knob 51 is rotated around the support shaft 29 and then the rear end portion of the switch knob 51 slightly moves upward (+Z side). Thus, the projection 51b of the switch knob 51 touches and pushes the opening switch 5 and thus causes the opening switch 5 to be actuated.

In addition, a force adding member (not illustrated in the drawings), such as a coil spring, is provided near the support shaft 29 such that the force adding member touches the lid 31 and the switch knob 51. Thus, upward force (+Z side) is added to the switch knob 51 by the force adding member to cause the lid 31 to close the aperture 6.

As shown in FIG. 8, a dividing wall 21 that divides an inside space of the housing 2 into a right space and a left space is provided in the housing 2. The left (+X side) space divided by the dividing wall 21 in the housing 2 functions as a storage chamber 23 for storing the camera 3. The aperture 6 extends between an inside of the storage chamber 23 and the outside of the vehicle-mounted electronic apparatus 1. The lid 31 prevents contact of the camera 3 stored in the storage chamber 23 with dust and/or moisture by closing the aperture 6 and thus protects the camera 3.

As shown in FIG. 9, the camera 3 is stored in the storage chamber 23. A rotation shaft 3a is provided to each of a left side surface and a right side surface of the camera 3, and a guide groove 23a is provided to each of a left side wall and a right side wall of the storage chamber 23. The guide groove 23a linearly extends from a rear portion of the storage chamber 23 toward the aperture 6.

The rotation shafts 3a of the camera 3 are engaged with the guide grooves 23a, respectively. Thus, the rotation shafts 3a are movable linearly along the guide grooves 23a and also the camera 3 is rotatable around the rotation shafts 3a.

In addition, a link lever 44 and a drive shaft 43 that are a part of the movement mechanism 4 is provided to the storage chamber 23. One end of the link lever 44 is connected to the drive shaft 43 and when the drive shaft 43 is rotated, the link lever 44 is rotated around the drive shaft 43. An engaging groove 44b is provided to another end of the link lever 44, and the engaging groove 44b is engaged with an engaging shaft 3b provided to an end portion on an opposite side of the lens 3c of the camera 3. Therefore, when the link lever 44 is rotated, the camera 3 is moved.

On the other hand, in the right (−X side) space divided by the dividing wall 21 in the housing 2 functions as a gear box 24 for storing gears and the like of the movement mechanism 4 (refer to FIG. 8).

As shown in FIG. 10, a motor 41 and a plurality of gears 42 that are a part of the movement mechanism 4 are provided to the gear box 24. The motor 41 is a driving source that generates driving force and is rotated under control of the controller 10. The plurality of gears 42 delivers the driving force of the motor 41 to the drive shaft 43. Therefore, when the motor 41 is rotated, the drive shaft 43 is rotated. The link lever 44 is rotated by rotation of the drive shaft 43, and thus the camera 3 is moved.

The position sensor 32 that detects the position of the camera 3 is provided to the gear box 24. The position sensor 32 is, for example, a rotary encoder that detects a rotation angle of the drive shaft 43 and detects the position of the camera 3 based on the rotation angle of the drive shaft 43.

<4. Movement of Camera>

Figure 11:
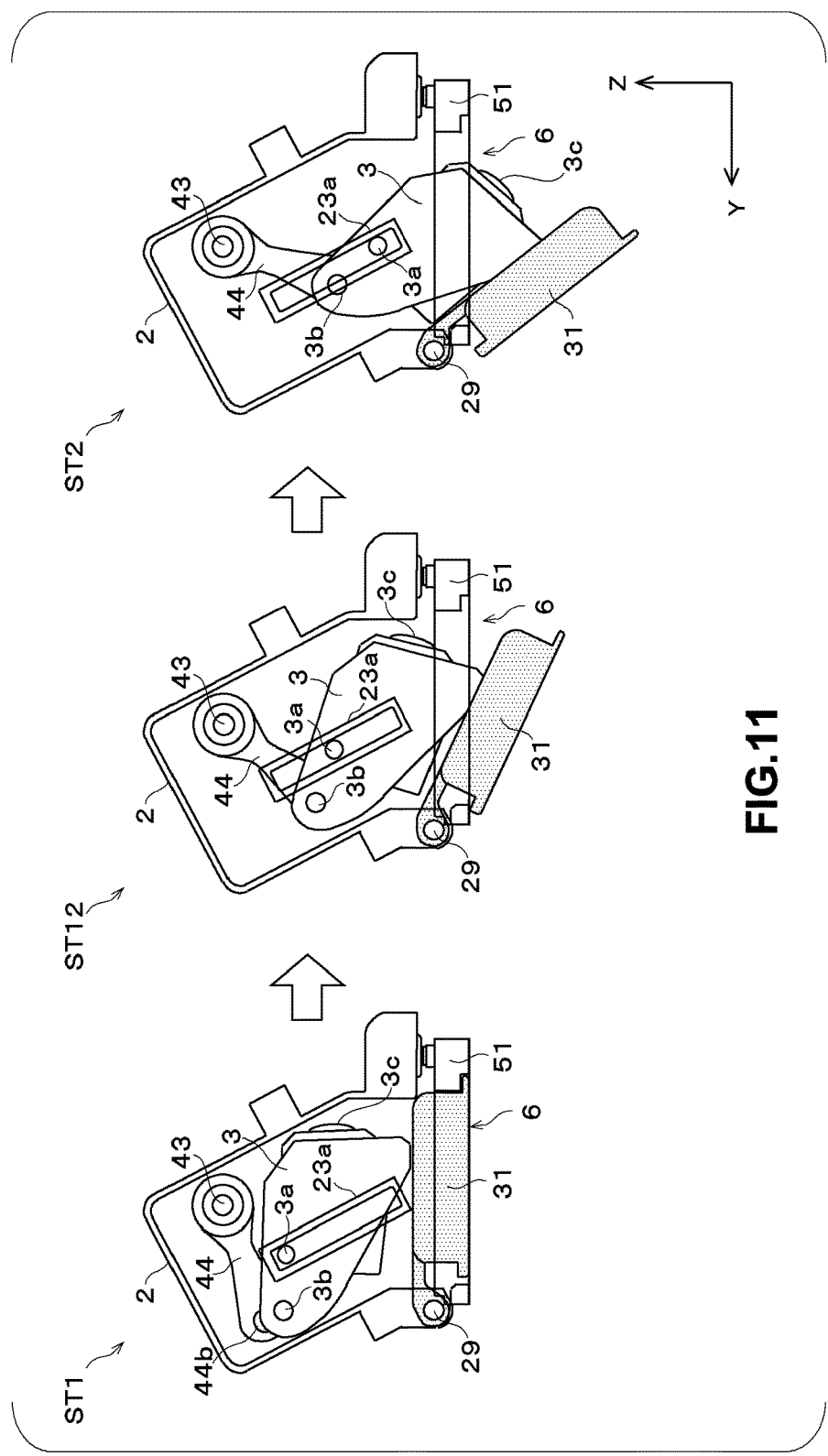
FIG. 11 illustrates movement of a camera.

Next, movement of the camera 3 moved by the movement mechanism 4 is described. FIG. 11 illustrates movement of the camera 3.

In the no image capturing state ST1 shown on a left portion of FIG. 11, the camera 3 is stored in the stored position in the housing 2. When the motor 41 is rotated in the no image capturing state ST1, the drive shaft 43 is rotated counterclockwise in the drawing.

The link lever 44 is rotated counterclockwise around the drive shaft 43 in the drawing by rotation of the drive shaft 43, and the link lever 44 pushes an upper end portion of the camera 3 downward (−Z side). The rotation shafts 3a of the pushed camera 3 moves linearly toward the aperture 6 along the guide grooves 23a. Moreover, the engaging shaft 3b of the camera 3 is moved by the link lever 44 and the camera 3 is rotated clockwise around the rotation shafts 3a in the drawing.

As a result, as shown in a state ST12 in a center portion of FIG. 11, while the camera 3 is rotated such that the lens 3c thereof faces downward (−Z side), the entire camera 3 is moved toward the aperture 6. Moreover, since a lower end portion of the camera 3 pushes an inner wall of the lid 31, the lid 31 is rotated around the support shaft 29 and opens the aperture 6 against the added force added by the force adding member.

When the drive shaft 43 is further rotated counterclockwise in the drawing from the state ST12 shown in the center portion of FIG. 11, the link lever 44 is rotated around the drive shaft 43 and pushes the upper end portion of the camera 3 further downward (−Z side). As the rotation shafts 3a of the pushed camera 3 is moved further toward the aperture 6 along the guide grooves 23a, the camera 3 is further rotated around the rotation shafts 3a clockwise in the drawing. Thus, the lid 31 opens the aperture 6 widely and the lens 3c of the camera 3 is completely moved outside. Accordingly, as shown in a right portion of FIG. 11, the camera 3 is moved to the image capturing position and the vehicle-mounted electronic apparatus 1 is in the image capturing state ST2.

Reversely, when the drive shaft 43 is rotated clockwise in the image capturing state ST2 in the drawing, the link lever 44 is rotated clockwise around the drive shaft 43 in the drawing and thus the link lever 44 pulls the upper end portion of the camera 3 upward (+Z side). Thus, since the camera 3 is moved reversely as compared to the description above, the camera 3 is eventually moved to the stored position as shown in the left portion of FIG. 11 and the vehicle-mounted electronic apparatus 1 is in the no image capturing state ST1. In this case, the lid 31 closes the aperture 6 due to the added force added by the force adding member.

As described above, the movement mechanism 4 rotates the camera 3 around the rotation shafts 3a while moving the rotation shafts 3a linearly. Therefore, as compared to a case where the camera 3 is simply moved linearly, a space necessary to store the camera 3 can be smaller.

<5. Operation of Opening Switch>

Next, works of the opening switch 5 is described. As described above, the opening switch 5 is actuated when the user presses the main surface of the switch knob 51 from the lower side (−Z side). In the no image capturing state ST1, the opening switch 5 is actuated also when the user presses the main surface of the lid 31 from the lower side (−Z side).

Figure 12:
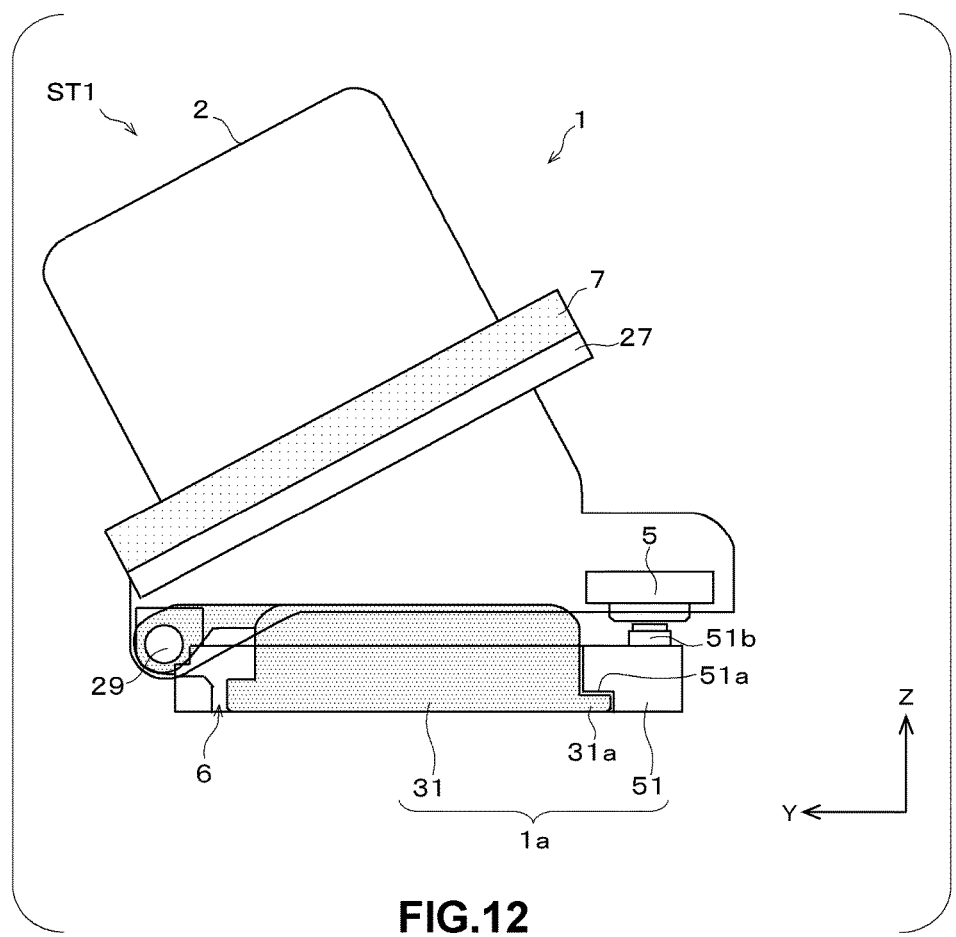
FIG. 12 illustrates a work of an opening switch.

As shown in FIG. 12, a contact portion 31a projecting in an opposite direction of the support shaft 29 of the lid 31 is provided to an end portion on the opposite side of the support shaft 29 of the lid 31 (also refer to FIGS. 4 and 5). When the vehicle-mounted electronic apparatus 1 is in the no image capturing state ST1, the contact portion 31a of the lid 31 faces a contact portion 51a provided to an inner side of the switch knob 51.

When the user presses the main surface of the lid 31 from the lower side (−Z side), the contact portion 31a of the lid 31 comes in contact with the contact portion 51a of the switch knob 51 and thus the lid 31 presses the switch knob 51 upward (+Z side). Thus, the lid 31 and the switch knob 51 are rotated together around the support shaft 29. Accordingly, the rear end portion of the switch knob 51 is moved upward (+Z side) and thus causes the opening switch 5 to be actuated.

As described above, the user presses the lid 31 for opening and closing the aperture 6 through which the camera 3 is moved in and out to cause the opening switch 5 to be actuated and thus can open the trunk lid 99. Therefore, even in a case where the vehicle-mounted electronic apparatus 1 includes the opening switch 5 and the camera 3 as one unit, the user can operate the opening switch 5 as usual.

Moreover, the user can operate the opening switch 5 and thus can open the trunk lid 99 by pressing any of the lid 31 and the switch knob 51 that serve as the bottom surface 1a of the vehicle-mounted electronic apparatus 1. Generally, it is difficult to see the bottom surface 1a of the vehicle-mounted electronic apparatus 1, but the user does not have to discriminate the switch knob 51 from the lid 31 to operate the opening switch 5.

<6. Installation of Vehicle-Mounted Electronic Apparatus>

Figure 13:
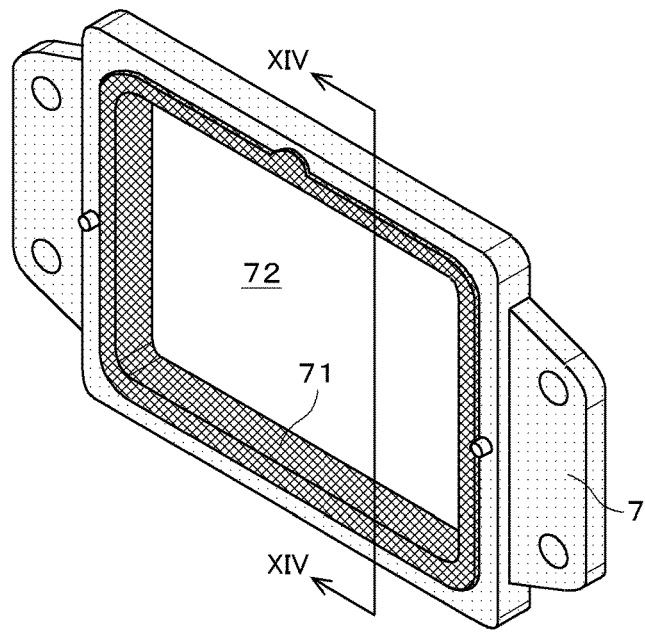
FIG. 13 illustrates a perspective view of a bracket.
Figure 14:
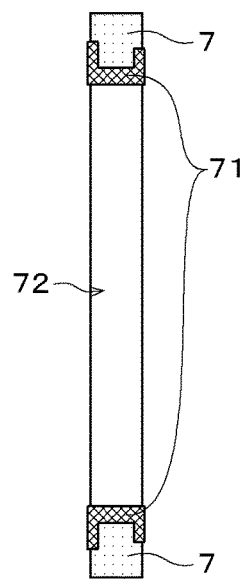
FIG. 14 illustrates a cross-section view of the bracket.

Next, installation of the vehicle-mounted electronic apparatus 1 to the vehicle 9 is described. FIG. 13 illustrates a perspective view of the bracket 7. FIG. 14 illustrates a cross-section view of the bracket 7 along the line XIV-XIV.

As shown in those drawings, an aperture 72 is formed inside the bracket 7, and a sealing member 71 made of elastic, such as rubber, is provided to the aperture 72. The sealing member 71 entirely covers a facing surface that faces the aperture 72 of the bracket 7 and also covers a portion abutting the facing surface.

Figure 15:
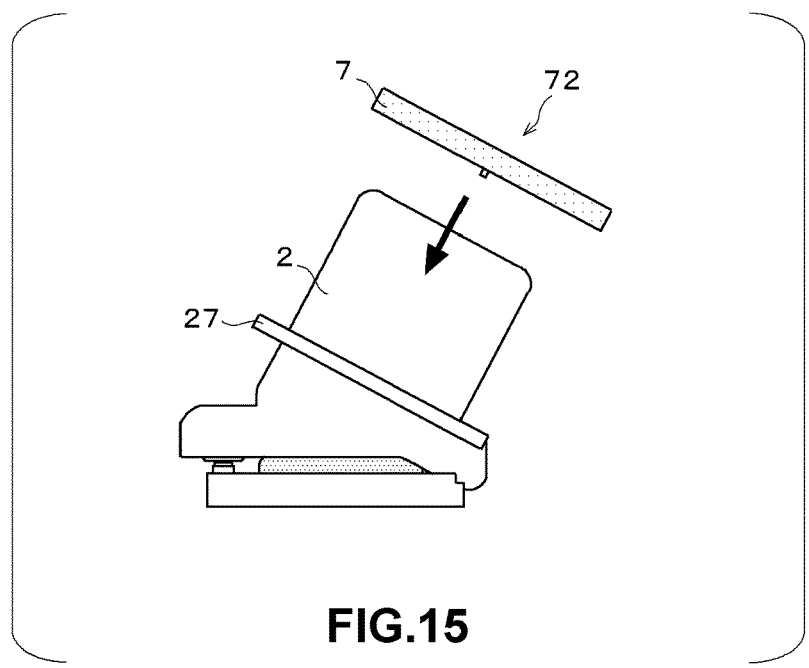
FIG. 15 illustrates installation of the bracket.

As shown in FIG. 15, the bracket 7 is installed to the housing 2 in a state where a part of the housing 2 is inserted in the aperture 72 of the bracket 7. The bracket 7 is fixed to a flange 27 projecting around the housing 2, with fastenings, such as screws. Since the sealing member 71 is inserted between the bracket 7 and the housing 2, water is prevented from entering between the bracket 7 and the housing 2.

Figure 16:
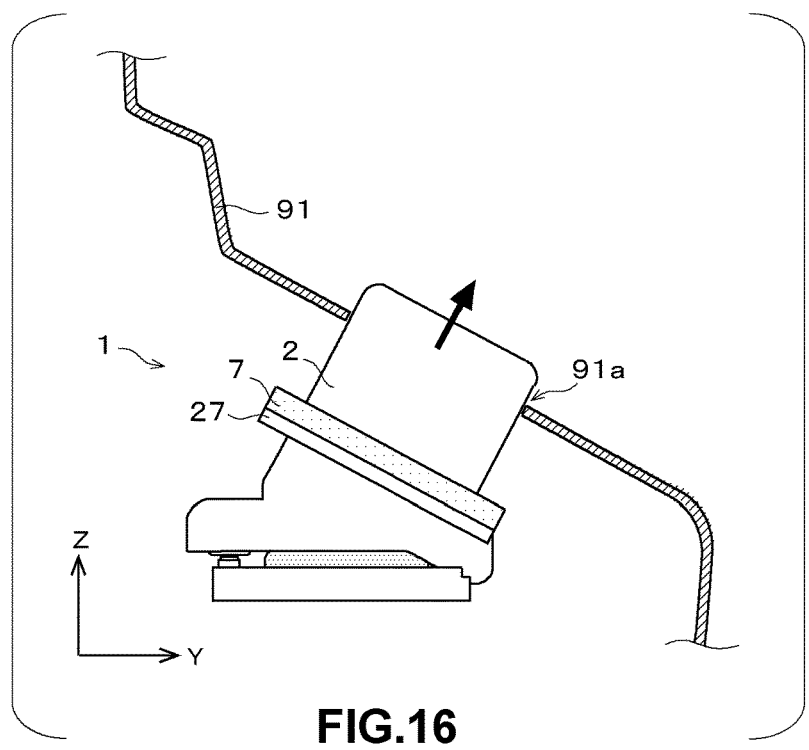
FIG. 16 illustrates installation of the vehicle-mounted electronic apparatus.

Further, as shown in FIG. 16, the bracket 7 is installed to the vehicle back panel 91 of the vehicle 9 with fastenings, such as screws, in a state where a part of the housing 2 is inserted in an aperture 91a of the vehicle back panel 91 of the vehicle 9. Thus, the vehicle-mounted electronic apparatus 1 is fixed to the vehicle 9. Since the sealing member 71 is inserted between the bracket 7 and the vehicle back panel 91, water is prevented from entering between the bracket 7 and the vehicle back panel 91 of the vehicle 9. As a result, water is prevented from entering from the aperture 91a of the vehicle back panel 91 into an inside of the vehicle 9.

As described above, the vehicle-mounted electronic apparatus 1 of this embodiment includes: the camera 3 that captures the images of the outside of the vehicle 9; the storage chamber 23 in which the camera 3 is stored; and the lid 31 that opens and closes the aperture 6 extending between the inside of the storage chamber 23 and the outside of the storage chamber 23. Moreover, the vehicle-mounted electronic apparatus 1 further includes the opening switch 5 that is actuated in response to pressure applied to the lid 31 and that sends the opening signal for opening the trunk lid 99 when the opening switch 5 is operated.

The user can open the trunk lid 99 by pressing the lid 31 that opens and closes the aperture 6 to protect the camera 3. Therefore, the vehicle-mounted electronic apparatus 1 can include both of the opening switch 5 and the camera 3 as one unit. Then, the opening switch 5 and the camera 3 can be compactly installed in a same position of the vehicle 9 by installing the vehicle-mounted electronic apparatus 1 to the vehicle 9. As a result, a space for other parts can be saved near the vehicle-mounted electronic apparatus 1, and also the opening switch 5 and the camera 3 can be disposed to the center of the rear portion of the vehicle 9 in the horizontal direction that is an ideal position for both of the opening switch 5 and the camera 3.

Moreover, the vehicle-mounted electronic apparatus 1 includes the switch knob 51 that causes the opening switch 5 to be actuated by moving upward (+Z side). When the pressure is applied to the lid 31, the lid 31 presses the switch knob 51 to move the switch knob 51 upward (+Z side). Therefore, when operating any of the switch knob 51 and the lid 31, the user can actuate the opening switch 5. Thus, the user does not have to discriminate the switch knob 51 from the lid 31 to operate the opening switch 5.

<7. Modifications>

The embodiment of the invention is described above. However, the invention is not limited to the embodiment described above, but various modifications are possible. Such a modification is described below. Any form in the foregoing embodiments and the modifications described below may be arbitrarily combined with one another.

In the foregoing embodiment, when the lid 31 is pressed, the lid 31 and the switch knob 51 are moved together, like one unit. However, when the lid 31 is pressed, only the lid 31 may be moved and may press the opening switch 5, and thus the lid 31 may cause the opening switch 5 to be actuated.

In the foregoing embodiment, the lid 31 is configured as a member different from the switch knob 51. However, an outer rim of a lid is configured to be substantially same as an outer rim of the switch knob 51 of the foregoing embodiment and the lid may function also as the switch knob. In this case, when the camera 3 is moved to the image capturing position, the entire lid including the function of the switch knob is rotated and thus opens the aperture extending between the inside the storage chamber and the outside of the storage chamber.

In the foregoing embodiment, the opening switch 5 is provided to the lower side of the housing 2. However, the opening switch 5 may be provided separately from the housing 2. In this case, for example, when the lid 31 is pressed, the entire housing 2 may be moved and a part of the housing 2 may press the opening switch 5, and thus the opening switch 5 may be actuated.

In the foregoing embodiment, the opening switch 5 is for opening the trunk lid 99. However, the opening switch 5 may be for opening a door of a luggage compartment of a vehicle in a different style, such as a tailgate of a station wagon and a backdoor of a hatchback.

In the foregoing embodiment, the vehicle-mounted electronic apparatus 1 is mounted to the rear portion of the vehicle 9. However, the vehicle-mounted electronic apparatus 1 may be mounted to another portion of the vehicle 9. For example, the vehicle-mounted electronic apparatus 1 may be mounted to a front portion of the vehicle 9. In this case, for example, a camera 3 captures images of an area front of the vehicle 9 and an opening switch 5 may send a signal for opening a door of a front luggage compartment of the vehicle 9.

In the foregoing embodiment, the switch knob 51 is moved upward (+Z side) and thus causes the opening switch 5 to be actuated. However, the opening switch 5 may be moved in a predetermined direction other than upward.

In the foregoing embodiment, the movement mechanism 4 rotates the camera 3 while moving the camera 3 linearly. However, the movement mechanism may only rotate the camera 3 or may move the camera 3 linearly. Moreover, a movement mechanism may only open and close the lid 31 without moving the camera 3.

While the invention has been shown and described in detail, the foregoing description is in all aspects illustrative and not restrictive. It is therefore understood that numerous other modifications and variations can be devised without departing from the scope of the invention.

What is claimed is:

1. A vehicle-mounted electronic apparatus that is configured to be mounted on a vehicle, the vehicle-mounted electronic apparatus comprising:
    a camera that captures images of an outside of the vehicle;
    a storage chamber in which the camera is stored;
    a lid that opens and closes an aperture extending between an inside of the storage chamber and an outside of the storage chamber, the lid moving in a first direction from a closed position to an open position, the lid closing the aperture when in the closed position, the lid opening the aperture when in the open position, the lid being movable in a second direction different from the first direction when the lid is in the closed position; and
    an opening switch that is positioned relative to the lid so that the opening switch is actuated in response to movement of the lid in the second direction from the closed position when a manually applied pressure is applied to the lid in the second direction when the lid is in the closed position and that sends a signal for opening a door of a luggage compartment of the vehicle when the opening switch is actuated.

2. The vehicle-mounted electronic apparatus according to claim 1, further comprising:
    a movement mechanism that moves the camera through the aperture.

3. The vehicle-mounted electronic apparatus according to claim 2, wherein
    the movement mechanism rotates the camera around a rotation shaft while moving the rotation shaft linearly.

4. The vehicle-mounted electronic apparatus according to claim 1, further comprising:
    a switch knob that causes the opening switch to be actuated by moving in a predetermined direction toward the opening switch, wherein
    when the pressure is applied to the lid, the lid presses the switch knob to move the switch knob in the predetermined direction.

5. The vehicle-mounted electronic apparatus according to claim 4, wherein
    a main surface of the lid is surrounded by a main surface of the switch knob.

6. The vehicle-mounted electronic apparatus according to claim 1, wherein
    the camera captures images of an area behind the vehicle,
    the luggage compartment is a rear luggage compartment of the vehicle, and
    the opening switch sends the signal for opening the door of the rear luggage compartment of the vehicle.

7. A vehicle-mounted electronic apparatus that is configured to be mounted on a vehicle, the vehicle-mounted electronic apparatus comprising:
    a camera that captures images of an outside of the vehicle;
    a lid that protects the camera, the lid moving in a first direction from a closed position to an open position, the lid covering and protecting the camera when in the closed position, the lid uncovering the camera so that the camera can capture the images of the outside of the vehicle when in the open position, the lid being movable in a second direction different from the first direction when the lid is in the closed position; and an opening switch that is positioned relative to the lid so that the opening switch is actuated in response to movement of the lid in the second direction from the closed position when a manually applied pressure is applied to the lid in the second direction when the lid is in the closed position and that sends a signal for opening a door of a luggage compartment of the vehicle when the opening switch is actuated.

8. The vehicle-mounted electronic apparatus according to claim 7, wherein the camera captures images of an area behind the vehicle, the luggage compartment is a rear luggage compartment of the vehicle, and the opening switch sends the signal for opening the door of the rear luggage compartment of the vehicle.

* * * * *